United States Patent [19]

Kobori et al.

[11] 4,206,991
[45] Jun. 10, 1980

[54] PENTAGONAL ROOF REFLECTING MIRROR ASSEMBLY FOR SINGLE LENS REFLEX CAMERAS

[75] Inventors: Toshio Kobori, Sakai; Isamu Uchida, Kawachinagano, both of Japan

[73] Assignee: Minolta Camera Kabushiki Kaisha, Osaka, Japan

[21] Appl. No.: 921,236

[22] Filed: Jul. 3, 1978

[30] Foreign Application Priority Data

Jul. 20, 1977 [JP] Japan ................... 52-87755

[51] Int. Cl.² ............................................. G03B 13/06
[52] U.S. Cl. ..................... 354/225; 354/155; 350/286
[58] Field of Search ............... 354/155, 199, 200, 201, 354/219, 224, 225, 53, 54, 55, 56, 57, 59; 350/286

[56] References Cited

U.S. PATENT DOCUMENTS

| 3,182,576 | 5/1965 | Papke | 354/155 |
|---|---|---|---|
| 3,387,530 | 6/1968 | Ebertz | 354/225 |
| 3,603,200 | 9/1971 | Hiruma | 354/225 |
| 3,618,449 | 11/1971 | Hiruma et al. | 354/219 |
| 3,620,147 | 11/1971 | Ataka et al. | 354/155 |
| 3,760,700 | 9/1973 | Trankner et al. | 354/155 |
| 3,840,298 | 10/1974 | Okuno | 354/155 |
| 3,911,457 | 10/1975 | Okuno | 354/225 |
| 3,952,321 | 4/1976 | Matui | 354/225 |
| 3,962,710 | 6/1976 | Okuno et al. | 354/155 |
| 4,063,261 | 12/1977 | Kuboshima | 350/286 |

FOREIGN PATENT DOCUMENTS

| 1127202 | 4/1962 | Fed. Rep. of Germany | 354/155 |
|---|---|---|---|
| 1174231 | 3/1959 | France | 354/53 |
| 50419 | 9/1966 | German Democratic Rep. | 354/155 |

*Primary Examiner*—L. T. Hix
*Assistant Examiner*—Alan Mathews
*Attorney, Agent, or Firm*—Jackson, Jones & Price

[57] ABSTRACT

A pentagonal roof reflecting mirror assembly for use in a viewfinder optical system of a single lens reflex camera is provided. The roof mirror assembly is of a modular form and includes an upper roof member and a lower roof support member that can be fastened together to form an enclosure that prevents the entrance of dust. The upper roof portion includes at least a pair of roof walls provided with a first and second mirror. The lower roof support member includes at least a lower light transmission wall and a side front wall provided with a third mirror positioned opposite to the first and second mirrors. The lower roof support member is molded of a transparent plastic material to permit light flux for the viewfinder optical system to enter the enclosure through the lower light transmission wall. Optical elements such as prisms, fresnel lens, plano-convex and plano-concave lenses can be molded as an integral part of the support assembly.

20 Claims, 16 Drawing Figures

PENTAGONAL ROOF REFLECTING MIRROR ASSEMBLY FOR SINGLE LENS REFLEX CAMERAS

BACKGROUND OF THE INVENTION

1. Field of the Invention

The present invention relates to a pentagonal roof reflecting mirror assembly for use in a viewfinder optical system of a single lens reflex camera and more particularly to a dust free modular unit that is capable of incorporating optical reflecting and refracting elements to compliment the viewfinder optics.

2. Description of the Prior Art

As is generally known, a pentagonal roof type reflecting mirror assembly is made up of a pair of roof reflecting mirrors and a third reflecting mirror to transmit an image of the object scene to a viewer for aiming and focusing the camera. With the advent of more sophisticated 35 millimeter cameras, there has been additional requirements of incorporating various information displays directly into the viewfinder screen to assist the viewer during photography.

A further requirement is the modern tendency to make the 35 millimeter camera as compact and light weight as possible. In this regard, there has been suggestions to utilize a plastic housing structure for the pentagonal roof reflecting mirror assembly. As can be appreciated by a skilled photographer, the pentagonal roof reflecting mirror assembly is removable on more expensive cameras in order to permit an optional changing of the focusing screens to accomodate a particular desired type of photography such as astro photography, dim light applications, dioptric and parallax focusing with close ups.

One suggestion to provide a lighter weight and economical plastic pentagonal roof reflecting mirror assembly can be seen in U.S. Pat. No. 3,603,200. Another example can be seen in U.S. Pat. No. 3,618,449 wherein side and rear wall members are provided to both reinforce the roof reflecting mirror and to prevent the introduction of undesirable or stray light. These plastic reflecting mirror assemblies are open at the bottom for coaction with the focusing screen and are subject to the entry of dust through the open bottom portion which will adhere to the mirror and effect the resulting image transmitted to a viewer. Additional prior art exists in the following;

Japanese Utility Model publication No. 47-24420, published on Aug. 2, 1972; Japanese Patent publication No. 47-4095, published on Feb. 4, 1972; Japanese Utility Model publication No. 47-20836, published on July 12, 1972; Japanese Utility Model publication No. 47-33315, published on Oct. 7, 1972; Japanese Utility Model publication No. 47-33317, published on Oct. 7, 1972; Japanese Utility Model publication No. 49-12602,, published on Mar. 28, 1974 and East German Pat. No. 50,419, published on Apr. 20, 1966.

There is a desire in the prior art to meet the demands of a compact 35 millimeter single lens reflex camera with an improved pentagonal roof reflecting mirror assembly that would be free from dust, economical to produce, and complimentary to both the viewfinder optics and the informational displays that are now required in viewfinder screens.

SUMMARY OF THE INVENTION

A primary object of the present invention is to provide an improved pentagonal roof reflecting mirror assembly capable of preventing dust from adhering to the roof reflecting mirrors.

An additional object of the present invention is to provide a modular pentagonal roof reflecting mirror assembly that is complementary to both a viewfinder optical system and information display.

According to the present invention, the pentagonal roof reflecting mirror assembly is formed from an upper roof portion and a lower roof support member that provides a dust free enclosure. The lower roof support member is made from a transparent plastic material that permits the entrance of flux into the viewfinder system. The upper roof portion is provided with a pair of roof type reflecting mirrors. The lower roof support member includes a light transmitting bottom wall and a side wall supporting a third reflecting mirror positioned relatively opposite to the upper roof type reflecting mirrors to transmit an image. This modular assembly of the upper roof portion and the lower roof support member can be economically manufactured and will be free from dust since there are no openings to permit access to the interior enclosure. Since the resulting reflecting mirror assembly includes at least a portion of transparent plastic material it is capable of integrally molding additional optical elements to compliment the viewfinder optical system and information displayed. By integrally molding these members into the pentagonal roof reflecting mirror assembly there is an additional saving of mounting brackets and assembly time required in alignment of the optical elements.

The present invention further permits the upper roof portion and the lower roof support member to be molded in shapes that are complimentary to each other and will determine the relative positions between the pair of roof type reflecting mirrors and the third reflecting mirror without any additional adjustment time required during assembly.

The foregoing and other objects, features and advantages of the present invention will become more readily apparent from the following description of illustrated embodiments thereof taken in reference with respect to the accompanying drawings.

DESCRIPTION OF THE PREFERRED EMBODIMENTS

The following description is provided to enable any person skilled in the camera industry to make and use the invention and sets forth the best modes contemplated by the inventors in carrying out their invention. Various modifications, however, will remain readily apparent to those skilled in the art, since the generic principles of the present invention have been defined herein specifically to provide for a relatively economical and light weight pentagonal roof reflecting mirror assembly that is compatible with supporting optical elements and information display.

Figure 1:
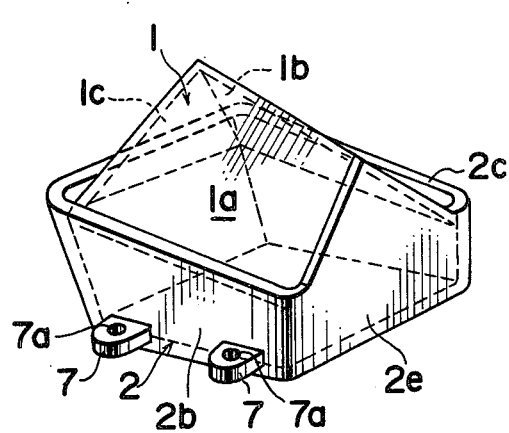
FIG. 1 is a perspective view of a basic embodiment of the present invention disclosing a pentagonal roof reflecting mirror assembly.
Figure 2:
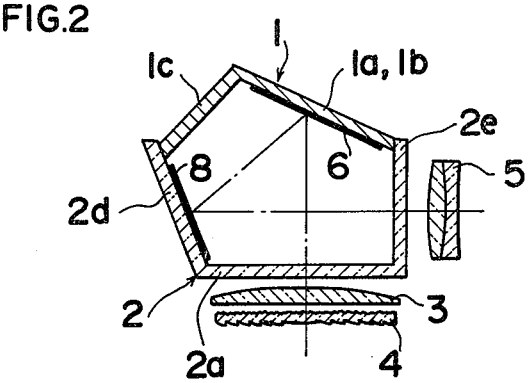
FIG. 2 is a cross sectional view of the embodiment shown in FIG. 1 in combination with a focusing screen and ocular member.

Referring to FIGS. 1 and 2, which show a basic structure according to the present invention, member 1 represents an upper roof portion, member 2 is a lower roof support, member 3 is a condenser lens, member 4 is a focusing plate and member 5 is a viewfinder ocular. Upper roof portion 1 is made of an opaque plastic material as a single unitary piece with roof walls 1a and 1b supporting a pair of roof reflecting mirrors 6.

Lower roof support member 2 is molded of a transparent plastic material in a one piece construction. Mounting brackets 7 can attach the assembly to a camera body (not shown). The lower roof support member 2 further consists of a bottom wall 2a, side walls 2b and 2c, front wall 2d and rear wall 2e. Front wall 2d can support a third reflecting mirror 8 juxaposition opposed to the reflecting mirrors 6 to transmit an image through the modular unit. Upper roof portion 1 and lower roof support member 2 comprise two plastic component parts which can be fastened together to create a dust tight enclosure. The roof walls 1a and 1b of roof portion 1 are designed to closely fit into the side walls 2b and 2c, and rear wall 2e of lower roof support member 2. An upper front wall 1c is provided in front of roof walls 1a and 1b and can be securely fitted to front wall 2d of roof support 2. With this arrangement, an enclosure is formed by fitting upper roof portion 1 into lower roof support 2, and this construction prevents dust from entering and thereby prevents dust from adhering to reflecting mirrors 6 and 8. Furthermore, since lower roof support 2 is made of a transparent plastic material, the light flux can pass through focusing plate 4 and condenser lens 3, and then pass through the bottom wall 2a of the lower roof support 2. The light flux is subsequently reflected off reflecting mirrors 6 and 8, and afterwards passed through the rear wall 2e of roof support 2 to reach ocular 5.

In the above arrangement, wherein the upper roof portion 1 is complementarily fitted into the lower roof support 2, the relative positions between the pair of reflecting mirrors 6 and the side reflecting mirror 8 are predetermined by the molded parts. Thus by merely assembling the two separate plastic injection molded parts it is possible to correctly align and position the roof reflecting mirrors and thereby save the labor time expended in adjusting a mirror. Additionally, since the angle between the roof walls 1a and 1b can be precisely maintained in a single unitary part any distortion resulting from relative changes in the upper roof portion 1 can be eliminated.

Referring to FIG. 1, mounting brackets 7 can be integrally molded with the lower roof support member 2. The mounting brackets 7 can have an aperture or threaded hole 7a which will accept screws for a precisely aligned mounting of the modular unit onto a camera body.

The subsequent FIGS. 3 through 15 show various species embodiment of the present invention that are especially complimentary to auxiliary optical elements in the viewfinder optical system and for the display of information in the viewfinder screen. In these embodiments like elements will use the same reference numbers in the drawings to prevent confusion and to permit a ready understanding of the present invention.

Figure 3:
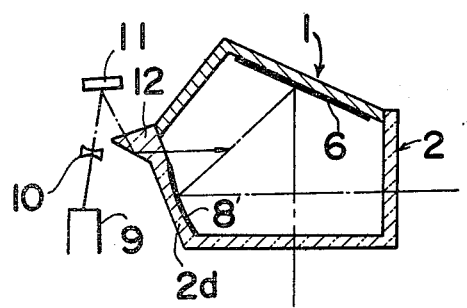
FIGS. 3 through 16 are cross sectional views of a second through fifteenth specie embodiments of the generic principles of the present invention.

Referring to FIG. 3, the pentagonal roof reflecting assembly is provided wherein display information is incorporated into the viewfinder information pattern. Such information can be the character markings on the diaphragm setting ring or a distance adjusting ring 9 on a lens barrel. The light from the distance adjusting ring 9 can pass through a biconcave lens 10 to provide a power adjustment to the transmitted image for subsequent reflecting on a planar reflecting mirror 11. The light reflected off of mirror 11 enters into a prism element 12 that is integrally molded into the front wall 2d of the lower roof support member 2. The viewer will see this information presented in the field of the viewfinder focusing screen and thereby will be aware of this information without removing his eyes from the viewfinder.

Figure 4:
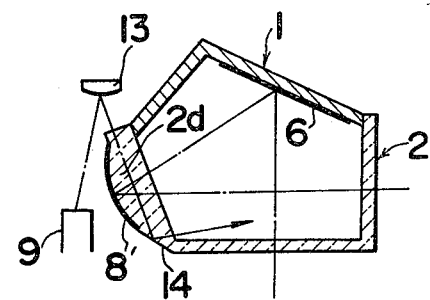

Referring to FIG. 4, another embodiment of the present invention is disclosed wherein the front wall 2d of lower roof support member 2 acts as a light guide for the display information from the distance adjusting ring 9. This information is first reflected on the convex mirror 13 into one end of the light guide and is subsequently reflected on the reflecting surface 14 provided at the bottom of front wall 3d to be visible to the viewer.

Figure 5:
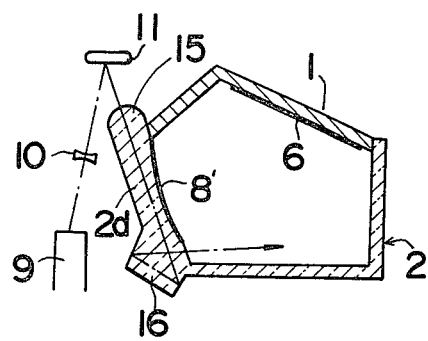

Referring to another embodiment of the present invention disclosed in FIG. 5, the front wall 2d also serves as a light guide and further includes a specially molded upper and lower end to provide a first convex surface 15 for power and diopter compensation and a lower prism 16 for reflecting the display information into the viewer's screen. Again the light emits from the distance adjusting ring 9 through concave lens 10 to be reflected on mirror 11 before entering the convex surface 15.

Figure 6:
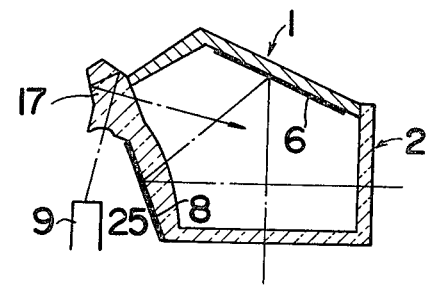

Referring to another embodiment disclosed in FIG. 6, the concave lens 10, reflecting mirror 11 and prism 12, that were described and mentioned with respect to the embodiment disclosed in FIG. 3, are now replaced by one complex prism 17 which is formed as a one piece construction with the upper end of front wall 2d of the lower roof support.

As should be readily appreciated, the particular construction of the pentagonal roof reflecting mirror assembly is highly advantageous to an incorporation of supplemental display information into the viewfinder image space.

In each of the embodiments disclosed in FIGS. 3 through 5, the third reflecting mirror has the form of a concave mirror 8'. This is to provide increased power for the viewfinder optical system. In the embodiment of FIG. 3, the concave mirror 8' can be a reflective coating applied to the interior surface of the front wall 2d after it has been appropriately injection molded with the desired concave surface characteristic. In the embodiment shown in FIG. 4, the front wall can have a plano-convex configuration with the exterior surface coated to form a combination convex mirror lens.

In the embodiment disclosed in FIG. 6, the third reflecting mirror 8 is a plane mirror but the adjacent front wall 2d is plano-convex to optically provide a convex mirror lens.

Figure 7:
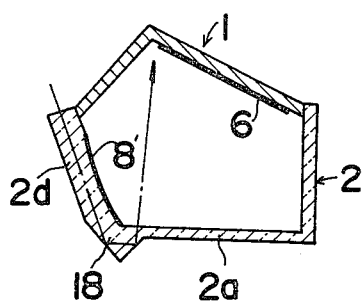
Figure 8:
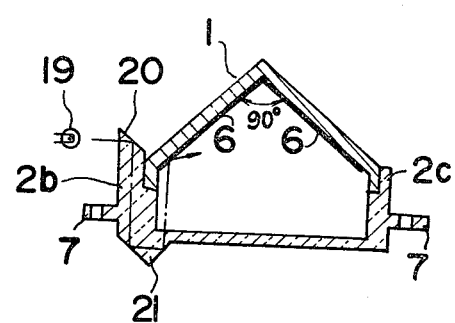
Figure 9:
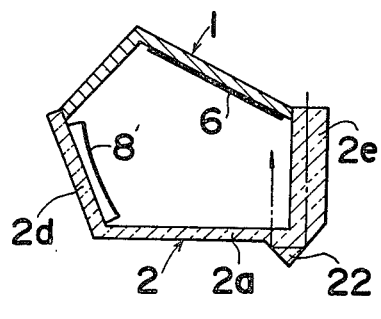

The embodiments subsequently to be shown in FIGS. 7 through 9 are particularly adaptable to displaying information from indicating optical systems computing such information within the camera body such as light level.

Referring to FIG. 7, an embodiment of the present invention is disclosed wherein the front wall 2d serves as a light guide for transmitting light from an information source (not shown) provided at the upper part of the front wall 2d. The light information passes through the front wall 2d and is reflected twice on an integral prism 18 formed at the bottom end of the front wall 2d and the front end of bottom wall 2a. This light information enters the enclosure and is incident on the pentagonal roof type reflecting mirror 6 for incorporation with the final image transmitted to the viewer.

Referring to the embodiment of FIG. 8, a side wall 2b also serves a secondary purpose as a light guide to transmit light from a lamp element 19 which itself can be an information source. For example, if the light level is inadequate, 19 can be pulsed to provide a blinking red light indicator in the transmitted image. The light information from lamp 19 is reflected three times by virtue of an upper prism 20 and a lower prism 21 positioned on the respective upper and lower ends of the side wall 2b. The transmitted light is made incident on the pentagon roof reflecting mirror 6 for ultimate transmission as part of the image to the viewer.

Another embodiment of the present invention is disclosed in FIG. 9 wherein the rear wall 2e further serves as a light guide to transmit light from an information source (not shown) provided at the upper part of rear wall 2e. The light information passing through rear wall 2e is reflected twice on an integral lower prism 22 formed at the lower end of rear wall 2e and the rear end of bottom wall 2a. Again this light is made incident on the pentagon roof reflecting mirror 6 for ultimate transmission to the viewer with the object scene. In the embodiment shown in FIG. 9, the third concave reflecting mirror 8' is not formed as a part of the wall 2d, but rather is a separate element that can be attached to the wall 2d.

Figure 10:
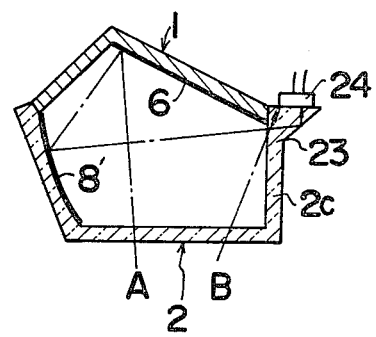
Figure 11:
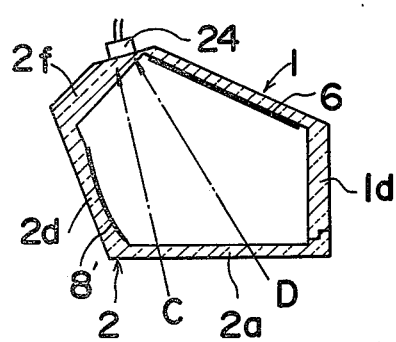

In the embodiments disclosed in FIGS. 10 and 11, the roof reflecting mirror assembly of the present invention incorporates an optical system to sample and receive light from the object scene. A light receiving element 24 such as a photo conductive element is mounted on a prism member 23 in the embodiment of FIG. 10. This prism 23 is molded as an integral part of the upper end of rear wall 2e. The light flux A from the front of a focusing plate (not shown) is made incident on prism 23 after being reflected on reflecting mirrors 6 and 8. The prism reflects this light on its rear portion and directs it to the light receiving element 24. Additionally, light flux B coming from the rear of a focusing plate (not shown) passes through the enclosure and goes straight through the prism to be incident on the light receiving element 24. As can be appreciated, the interfacing facet of prism 23 can further act as a retaining member for the light receiving element 24.

In the embodiment disclosed in FIG. 11, the lower roof support 2 consists of a bottom wall 2a, lateral side walls (not shown) front wall 2d which supports a third reflecting concave mirror 8', and upper front wall 2f which abuts against the roof walls 1a and 1b of the upper roof portion 1. The upper front wall 2f is capable of mounting a light receiving element 24. In this regard the upper front wall 2f acts as a light guide for transmitting the light flux C from the front of the focusing plate (not shown) and the light flux D from the rear of the focusing plate (not shown) through the light receiving element 24. The upper roof portion 1 comprises the roof walls 1a and 1b and the rear wall 1d which is transparent to provide an exit window for light from the viewfinder to the viewer. As can be readily appreciated, those portions of the enclosure wherein it is desired to block exterior light can be appropriately coated to be made opaque.

Figure 12:
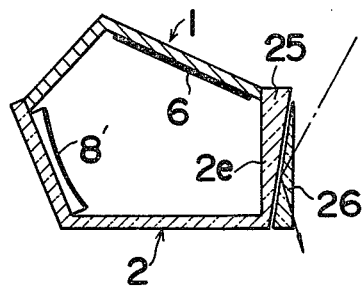
Figure 13:
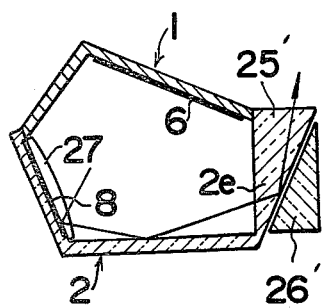

The embodiments of the present invention disclosed in FIGS. 12 and 13 are designed specifically to prevent undesirable or stray light from either interfering with the transmitted image to the viewer or entering into the camera through the viewfinder. Referring specifically to FIG. 12, a prism 25 is formed as the rear wall 2e and is complemented with a wedge shaped prism 26 positioned adjacent but apart to provide a small air opening between the respective prisms 25 and 26. The exterior incident light coming at a diagonal from the upper part of an ocular (not shown) will be totally reflected on the inclined surface of prism 26 downward as disclosed in FIG. 12. If it was only intended to prevent ambient incident light from entering into the viewfinder system, prism 25 would not be necessary. However, without prism 25 the light flux transmitting the image from the viewfinder reflecting mirrors would be deflected and chromatic aberrations would exist, therefore prism 25 is a chromatic compensating prism.

It should further be noted that FIG. 12 is somewhat similar to the embodiment disclosed in FIG. 13, however, the angle of inclination for the respective prisms 25' and 26' are relatively steep and are used in the optical system to prevent any ghost images from being observed in the viewfinder. Thus any ghost light would be totally reflected on the inclined surface of prism 25 and directed upward out of the optical axis and will not reach the eye through an ocular (not shown). Also in this embodiment, the third reflecting mirror 8 is further provided with a convex lens 27, to create a combination convex mirror lens.

In the above embodiments disclosed in FIGS. 3 through 13 the upper roof portion and the lower roof support form a one piece construction that is quite capable of incorporating auxilliary optical elements and information display devices. By incorporating these elements integrally with the housing components, no subsequent adjustment is required and the assembling time is minimized. Additionally any individual optical element retaining members are dispensed with to further reduce both assembling time and costs.

Figure 14:
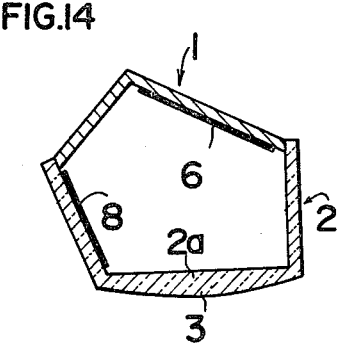
Figure 15:
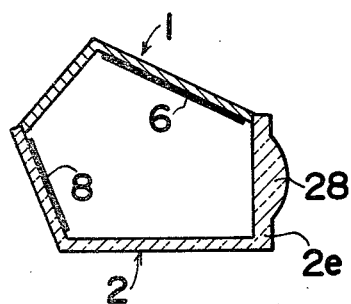
Figure 16:
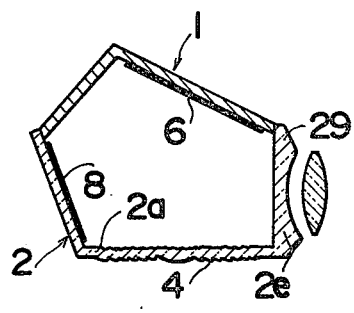

The embodiments disclosed in FIGS. 14 through 16 are specifically directed to a viewfinder system of a single lens reflex camera wherein individual optical elements of the optical system can be directly incorporated as a part of the lower roof support 2. For example referring to FIG. 14, a condenser lens 3 is formed as the bottom wall 2a of the roof support. Referring to FIG. 15, a singular element ocular 28 such as a power refracting element having a convex shape is formed integrally with the rear wall 2e of roof support 2. Finally referring to FIG. 16 a two element ocular front lens 29 can have one of the lens elements, plano-concave member, formed integrally as the rear wall 2e of roof support 2 while the focusing plate 4 can also be integrally formed as the bottom wall 2a. Obviously these embodiments can further incorporate some of the advantages disclosed with respect to the earlier embodiments of 3 through 13.

It should be realized in the foregoing descriptions of the various embodiments that they should not be limited to the specific embodiments so disclosed. For example in the arrangements disclosed, the upper roof portion 1 and the lower roof support 2 can be fitted into each other and still provide adjustment for relative positions between the reflecting mirrors 6 and 8. For example, it would be possible that the upper roof portion 1 could simply abut or be placed on roof support 2 and then both be subsequently fixed by a bonding agent after the relative positions between the pair of reflecting mirrors 6 and the reflecting mirror 8 have been adjusted. Additionally, although the lower roof support 2 is made of a transparent plastic material, it is also possible that after molding only those necessary portions of the lower roof support 2 will remain transparent with the other portions being treated for light shielding.

Accordingly, the scope of the present invention is possible of many different modifications and the present invention should be measured solely from the following claims, wherein we claim:

1. A pentagonal roof type reflecting mirror assembly for use in a viewfinder optical system of a single lens reflex camera comprising:
   a roof portion including at least roof walls;
   a first and a second mirror provided on said roof walls;
   a roof support including at least a front wall and at least a lower light transmitting wall and made of a transparent plastic material to permit light flux for said viewfinder optical system to pass through said lower light transmitting wall, said roof portion and said roof support constituting a dust tight enclosure; and
   a third mirror provided on said front wall relatively opposite to said first and second mirrors to receive and reflect said light flux reflected at said first and second mirrors after it passes through said lower light transmitting wall.

2. A pentagonal roof type reflecting mirror assembly as defined in claim 1, wherein said third mirror is formed on said front wall.

3. A pentagonal roof type reflecting mirror assembly as defined in claim 1, wherein said third mirror is attached to said front wall.

4. A pentagonal roof type reflecting mirror assembly as defined in claim 1, wherein said roof support further includes mounting brackets as a part thereof, the mounting brackets capable of being secured to said camera.

5. A pentagonal roof type reflecting mirror assembly as defined in claim 1, wherein said camera has an auxiliary optical system including at least one optical element coacting with said reflecting mirror, and wherein said roof support includes said optical element as an integral part thereof.

6. A pentagonal roof type reflecting mirror assembly as defined in claim 1, wherein said viewfinder optical system includes an optical element coacting with said reflecting mirror for formation of a viewfinder image, and wherein said roof support includes said optical element as an integral part thereof.

7. A pentagonal roof type reflecting mirror assembly as defined in claim 1, wherein said roof portion further includes an upper front wall which is adjacent to said front wall, and wherein said roof support includes a rear light exit wall and a pair of side walls which are adjacent to said roof walls.

8. A pentagonal roof type reflecting mirror assembly as defined in claim 1, wherein said roof portion is further made of a transparent plastic material and includes a rear light exit wall which is adjacent to said lower light transmitting wall of said roof support.

9. A pentagonal roof type reflecting mirror assembly as defined in claim 1 wherein the third reflecting mirror is concave.

10. A pentagonal roof type reflecting mirror assembly as defined in claim 9 wherein said front wall transmits light and is plano-convex, the reflecting mirror is coated on the exterior convex surface.

11. A pentagonal roof type reflecting mirror assembly as defined in claim 1 further including a deflecting prism for reflecting undesirable incident light rays.

12. In a viewfinder system for a single lens reflex camera, the improvement comprising a roof type reflecting mirror assembly including;
    a roof portion supporting a first and second mirror;
    a transparent roof support member molded of a transparent plastic material supporting a third mirror, the respective mirrors defining a portion of an optical path for the camera objective lens to the viewer and said roof portion and said roof support defining a hollow space therein and constituting a dust tight enclosure, and
    an integral light guide molded of said transparent plastic material as a part of the roof support member for transmitting light to convey at least information relative to one of the object scene and camera settings through the viewfinder system, the light guide further including at least one integral reflective surface for folding the information light path.

13. The invention of claim 12 wherein the reflective surface is a prism.

14. The invention of claim 1 wherein the transparent roof support member includes an integral power refracting element that is capable of forming a portion of the ocular viewfinder system.

15. The invention of claim 1 further including a deflecting prism for reflecting undesirable incident light rays.

16. The invention of claim 15 further including a second chromatic compensating prism adjacent the deflecting prism.

17. In a viewfinder system for a single lens reflex camera, the improvement comprising a roof type reflecting mirror assembly including;
    a roof portion supporting a first and second mirror;
    a transparent roof supporting member molded of a transparent plastic material and having a plurality of walls, one such wall supporting a third mirror, the respective mirrors defining a portion of an optical path from the camera objective lens to the view, the transparent roof support member further including an integral refracting member molded into another wall and forming a portion of the ocular viewfinder system for aiming and focusing the camera at an object scene, said roof and said roof support defining a hollow space therein and constituting a dust tight enclosure.

18. The invention of claim 17 wherein the roof support member includes a lower support wall having an integral focusing plate and a rear wall having a plano-concave refracting surfaces.

19. A pentagonal roof type reflecting mirror assembly for use in a viewfinder optical system of a single lens reflex camera comprising:
    a plastic roof portion including at least a pair of integral roof walls forming a first component part of the assembly;
    a first and a second mirror provided on said roof walls;
    a plastic roof support member including a front wall and at least a lower light transmitting wall, integrally formed of a transparent plastic material to provide a second component part of the assembly, to permit light flux for said viewfinder optical system to pass through said lower light transmitting wall, said roof portion and said roof support member joined together to constitute a dust tight hollow enclosure;

a third mirror provided on said light transmitting front wall relatively opposite to said first and second mirrors to receive and reflect said light flux reflected at said first and second mirrors after it passes through said lower light transmitting wall, and an integral light guide formed in the roof support member for transmitting light to convey at least information relative to one of the object scene and camera settings through the viewfinder system, the light guide further including at least one integral reflective surface for folding the information light path whereby the pair of plastic component parts are joined together to provide a complete housing assembly of a pentagonal roof type reflecting mirror assembly free from the intrusion of dust particles.

20. The invention of claim 19 wherein an integral portion of one of the roof portions and the roof support member is transparent for transmitting light reflected from the third mirror out of the mirror assembly to an observer.

* * * * *